United States Patent [19]

Winzer

[11] Patent Number: 4,684,390

[45] Date of Patent: Aug. 4, 1987

[54] RACK ALIGNING FIXTURE AND METHOD OF ITS USE

[75] Inventor: Frederick W. Winzer, East Granby, Conn.

[73] Assignee: Emhart Industries, Inc., Farmington, Conn.

[21] Appl. No.: 731,301

[22] Filed: May 7, 1985

[51] Int. Cl.⁴ .............................................. C03B 7/10
[52] U.S. Cl. ...................................... 65/133; 65/174; 65/334
[58] Field of Search ............... 65/158, 163, 334, 123, 65/133, 174, 207, 332; 83/623

[56] References Cited

U.S. PATENT DOCUMENTS

| | | | |
|---|---|---|---|
| 3,592,938 | 7/1971 | Bracken et al. | 65/334 |
| 3,918,951 | 11/1975 | Kitayama et al. | 65/334 |
| 4,215,611 | 8/1980 | Dahms | 83/623 |
| 4,450,741 | 5/1984 | Mumford | 83/623 |
| 4,499,806 | 2/1985 | Mumford | 65/334 |

Primary Examiner—S. Leon Bashore
Assistant Examiner—Michael K. Boyer

[57] ABSTRACT

A rack aligning fixture for aligning the racks of a rack and pinion mechanism is described. The rack alignment fixture permits the aligning of rack teeth faces of a rack and pinion mechanism at the time of assembly without having to provide additional machining of the individual parts in order to maintain the racks parallel with each other for proper mating of the rack teeth with the pinion gear teeth.

8 Claims, 5 Drawing Figures

RACK ALIGNING FIXTURE AND METHOD OF ITS USE

BACKGROUND OF THE INVENTION

This invention relates in general to new and useful improvements in a rack aligning fixture. More particularly, this invention relates to a fixture for aligning the racks of a rack and pinion mechanism of the type used in driving straight line shears for cutting glass runners into individual gobs.

U.S. Pat. No. 4,215,611 to Francis A. Dahms, granted Aug. 5, 1980, assigned to the assignee of the present invention, discloses a straight line shear wherein there are two slides mounted for guided movement towards and away from one another, and arranged in opposed relation. The slides carry cooperating blades. The slides are driven by racks which are interconnected by a pinion gear. The drive unit is in the form of a double-acting air cylinder or linear air motor which is coupled to one of the racks between that rack and an associated one of the slides.

In assembling a rack and pinion mechanism, particularly the rack and pinion mechanisms of the type used in a straight line shear mechanism, it is essential prior to placing the pinion gear in position that the face of the teeth of the racks be parallel with each other for proper mating of the teeth with the pinion gear teeth. In the past this parallelism has been established by incorporating additional features into the assembly such as keys and keyways properly oriented to position the rack teeth in the desired position. The inclusion of keys and keyways understandably is expensive from the standpoint of machining of the keys and keyways, in addition to the cost of the component parts.

Accordingly, there is a need for an alignment fixture and method of alignment which is inexpensive and which is simple in operation.

A primary object of the present invention, therefore, is to provide a means of aligning the rack teeth faces of a rack and pinion mechanism at the time of assembly without need to provide additional machining of the individual parts.

SUMMARY OF THE INVENTION

In accordance with the present invention, a rack aligning fixture is provided which will replace temporarily a part of the rack and pinion housing. The rack aligning fixture comprises a base plate having two accurately located and machined holes therein for receiving the racks. The base plate will have a recessed area in the back of the plate extending from about one-half way through one of the machined rack holes through about one-half way through the second machined rack hole. Located within the recessed area of the base plate in spaced-apart relation at an angle will be two holes for receiving two hardened pins. Two opposing wedges are also positioned in the recessed area of the base plate. For ease in location, each wedge has an oblong hole, with the wedge positioned by a shoulder screw passing through the hole so as to permit free movement of the wedges within a fixed area for transverse movement against the two hardened pins. Captive screw means are provided for attaching the rack aligning fixture on the rack and pinion housing.

In aligning the racks, a cap portion of the rack and pinion housing is replaced by the rack fixture using the captive screws. The racks of the rack and pinion mechanism will enter the two accurately located machined holes in the base plate of the aligning fixture. The two wedges positiond with the threaded fasteners are lightly driven against the hardened pins which are arranged at an angle, causing the wedges to move toward the gear face of the racks. This movement of the wedges causes the edge of each wedge to force the round rack rods to rotate in their housing until the gear teeth faces are fully engaged with the straight edge of the respective wedge. Since the straight edges of the two wedges are parallel with each other, the gear faces will also be parallel. The ends of the rods opposite of the racks can then be secured to a shear arm of a straight line shear or other machine component. After such securing, the rack aligning fixture can be removed and assembly of the pinion gear between the racks completed with the assurance that the rack and pinion teeth are properly aligned.

The utilization of the rack aligning fixture in relation to a straight line shear will be described in reference to the drawing wherein throughout like numerals refer to like parts.

BRIEF DESCRIPTION OF THE FIGURES

In the drawing, wherein throughout like numerals refer to like parts.

DETAILED DESCRIPTION OF THE PREFERRED EMBODIMENT

Figure 1:
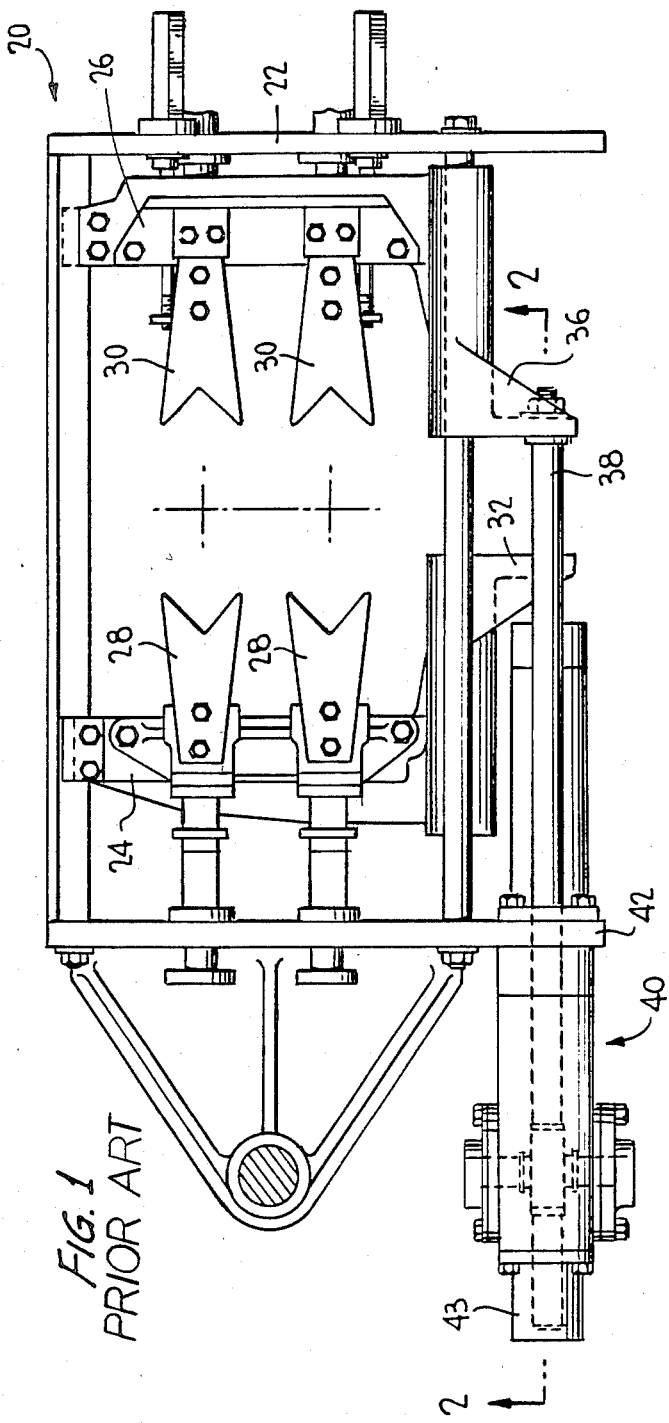
FIG. 1 is a schematic plan view of a straight line shear of the type disclosed in U.S. Pat. No. 4,215,611.

Referring now to the drawing in detail, reference is first made to FIG. 1 wherein there is illustrated a straight line shear generally identified by the numeral 20. This shear, in simple terms, includes a support or frame 22 which has suitable guides for a pair of opposed slides 24, 26 which are mounted within the support 22 for simultaneous reciprocation towards and away from one another. The slides 24, 26 carry blades 28, 30 which cooperate with one another for the purpose of shearing a glass runner to form gobs.

The slide 24 has a bracket 32 to which there is connected an actuating rod 34. The slide 26 has a similar bracket 36 to which there is coupled an actuating rod 38. The actuating rods 34, 38 are reciprocated by a drive assembly generally identified by the numeral 40.

Figure 2:
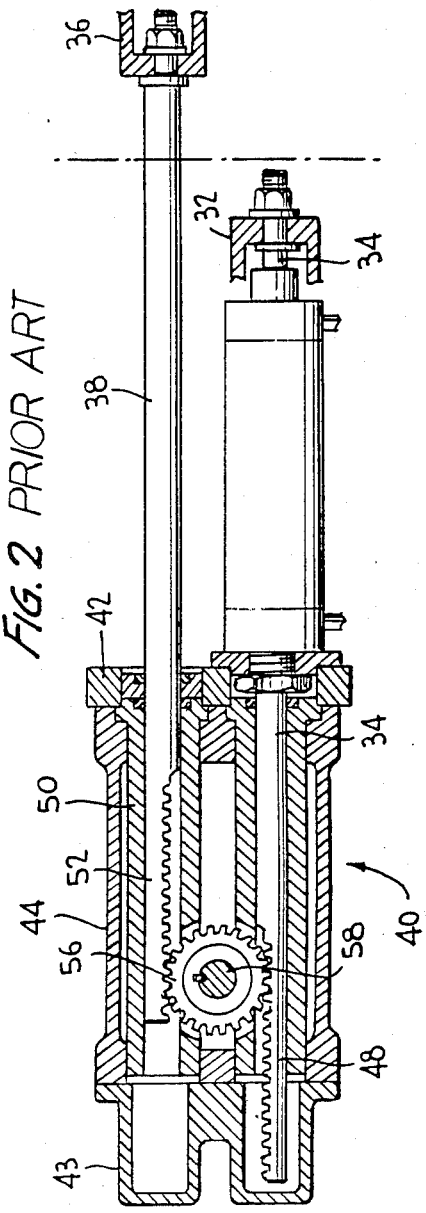
FIG. 2 is a view taken along line 2—2 of FIG. 1.

Reference is now made to FIG. 2 wherein there is illustrated a typical drive for the shear blades, such as the drive 40. It will be seen that the support 22 includes a mounting plate 42 which carries a housing 44. The housing 44 has mounted therein a guide tube 46 in which there is guidingly mounted one end of the rod 34. The terminal portion of the rod 34 includes a rack 48.

The housing 44 carries a second guide tube 50 in which there is guided for reciprocation an end portion of rod 38 which is also provided with a rack 52 which opposes rack 48. A pinion gear 56 is positioned between the racks 48, 52 and is meshed therewith. The pinion gear 56 is keyed to a drive shaft 58 which is suitably rotatably journaled within the housing 44.

As shown in FIGS. 1 and 2, the rack and pinion mechanism has a cap 43 replaceably positioned on housing 44. When this cap is removed, racks 48 and 52 are exposed.

Figure 3:
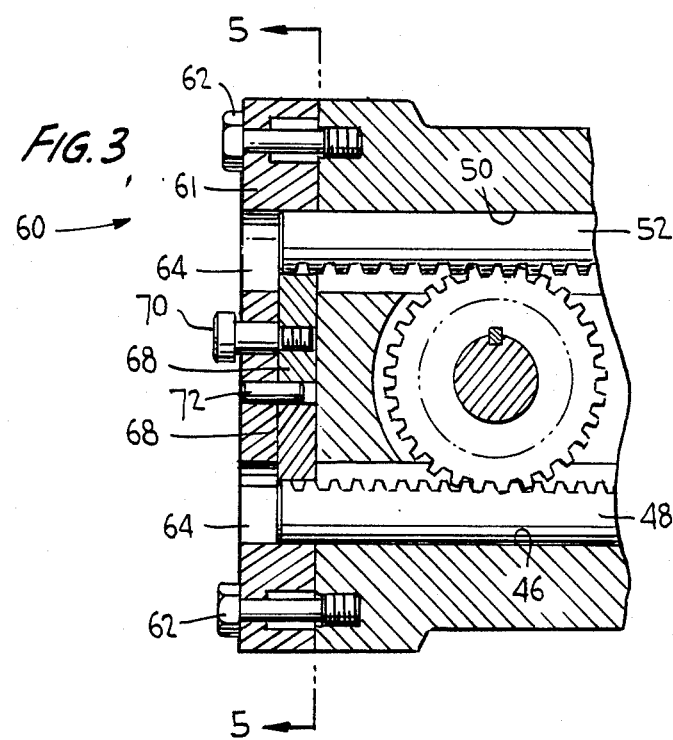
FIG. 3 is an enlarged view of the lefthand portion of FIG. 2 taken along line 3—3 of FIG. 4 showing the housing of the rack and pinion mechanism replaced in part with the alignment fixture of the present invention.
Figure 4:
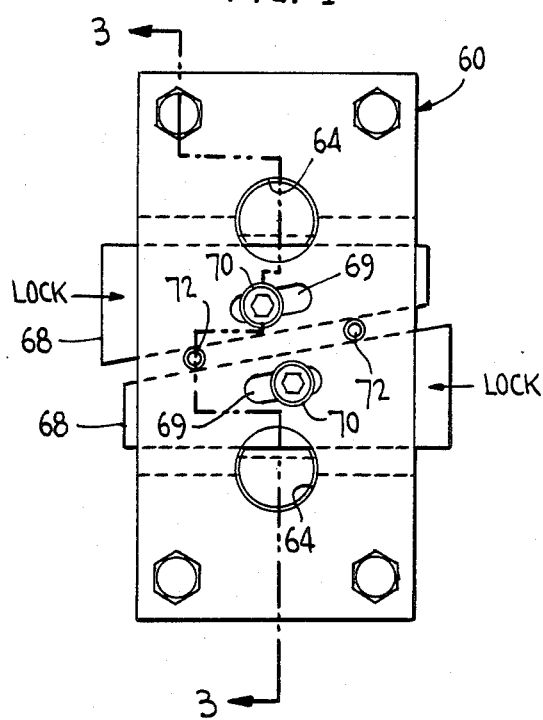
FIG. 4 is a left end view of the mechanism of FIG. 3.
Figure 5:
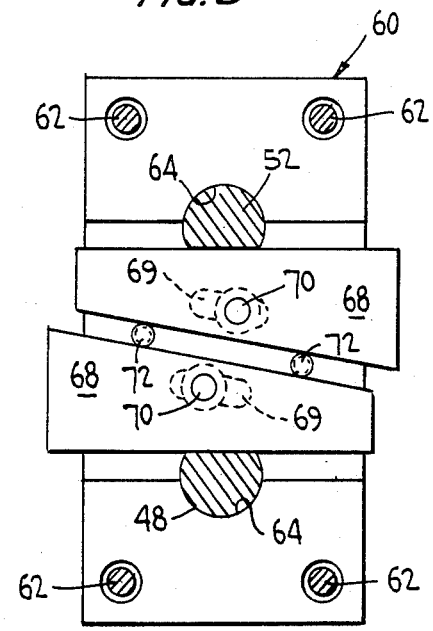
FIG. 5 is a view taken along line 5—5 of FIG. 3.

In using the alignment fixture of the present invention, cap 43 is removed. Racks 44 and 52 are each extended ou of the rack housing 44 one-half inch as shown in FIG. 3. Also as shown in FIG. 3, the alignment fixture of the present invention, generally designated 60, is attached to the rack housing. As shown, captive screws 62 pass through base plate 61 which is approximately one-inch thick, with the racks entering two accurately located and machined holes 64 in base plate 61. Two wedges having oblong holes 69 are positioned in a recess in the rear of the base plate and secured with threaded fasteners 70 so as to permit limited movement. Two hardened pins 72 are positioned in holes in said base plate at an angle between wedges 68. The two wedges 68 are lightly driven against the two hardened pins 72. The wedges, being arranged at an angle, move toward the gear face of the racks. This movement of wedges 68 causes the edge of each wedge to force the round rack rods 52, 48 to rotate in their housings 46 and 50 until the gear teeth faces are fully engaged with the straight edge of their respective wedge. Since the straight edges of two wedges are parallel to each other, the gear faces are now also parallel.

The opposite ends of the racks can now be secured to shear arm brackets 32 and 36. The rack aligning fixture can be removed and assembly of the pinion gear between the racks completed. Since the racks are parallel with each other, the rack and pinion gear teeth will be properly aligned.

Although in FIGS. 1, 2, and 3 the pinion gear is shown in place, it is to be understood that in the alignment of the rack using the fixture of the present invention the pinion gear will not be in place.

As will be apparent, although the rack alignment fixture has been described with reference to a rack and pinion mechanism for utilization with a straight line shear, it will be obvious that the fixture can be used, with suitable modification, with any machine component using a rack and pinion mechanism.

As will be apparent to one skilled in the art, various modifications can be made in the alignment fixture within the scope of the aforesaid description. Such modifications being within the ability of one skilled in the art form a part of the present invention and are embraced by the appended claims.

It is claimed:

1. An aligning fixture for aligning the rack teeth of two racks of a rack and pinion mechanism in parallel relation with each other to obtain proper mating of the rack teeth with the pinion gear teeth, said rack and pinion mechanism being used to drive straight line shears for cutting glass runners into individual gobs, said fixture comprising a base plate having two spaced-apart machined holes for receiving the racks of a rack and pinion mechanism, a recess means defined across the back of said base plate for receiving two opposing wedge means, said recess means extending through a portion of one of said machined holes and through a portion of the other of said machined holes, two opposed wedge means in said recess means for angularly orienting the rack teeth of each of the racks to face and be parallel to the rack teeth of the other rack, said wedge means movable relative to each other in said recess means and each of said wedge means having a straight edge, said straight edges being parallel to each other and extending into said two spaced-apart holes when said wedge means are in a mating position in said recess means, pins spaced-apart at an angle between said wedge means when said wedge means are positioned in said recess means so that said wedge means will ride on said pins, and means on said base plate for the attaching of said base plate to the housing of a rack and pinion mechanism for receiving the racks of said mechanism.

2. The fixture of claim 1 wherein said wedge means have oblong holes defined therein and are secured in said base plate with threaded fasteners passing through said holes so as to permit limited movement of said wedge means in said recess means.

3. The fixture of claim 2 wherein said pins are positioned in holes in said base plate.

4. The fixture of claim 4 wherein said base plate is approximately one-inch in thickness and said recess means is about one-half inch in depth.

5. The method of aligning the rack teeth of the racks of a rack and pinion mechanism in parallel relation with each other to obtain proper mating of the rack teeth with the pinion gear teeth, said rack and pinion mechanism being used to drive straight line shears for cutting glass runners into individual gobs, said method comprising the steps of: exposing the racks of said rack and pinion mechanism so as to extend from a housing of the rack and pinion mechanism; positioning a rack aligning fixture on said housing in order that said racks extend into an opening in said fixture; driving opposed wedges relative to each other, each of said wedges having one straight edge in opposed relation to the straight edge of the other in order that said wedges contact said racks and move said racks in relation to said wedges to obtain the straight edges of said wedges and the teeth of said racks in parallel relation.

6. An aligning fixture for aligning rack teeth of two racks of a rack and pinion mechanism in facing, parallel relationship with each other to obtain proper mating of the rack teeth with the pinion gear teeth, said rack and pinion mechanism being used to drive straight line shears for cutting glass runners into individual gobs, said fixture comprising:
   a base having a means defining a recess,
   means for attaching said base to a housing of said rack and pinion mechanism such that said racks extend into said recess means,
   two opposed wedge means movable relative to each other within said recess means for angularly orienting the rack teeth of each of the racks to face and be parallel to the rack teeth of the other rack, each of said wedge means having a straight edge and an opposite angled edge, and
   angled guide means against which said opposite, angled edges of said wedge means ride for supporting said straight edges parallel to each other and against said rack teeth when said wedge means are in a mating position in said recess means so that said rack teeth are supported in facing, parallel relationship to each other.

7. An aligning fixture as set forth in claim 6 wherein said guide means comprises two spaced pins aligned with the angled edges of said wedge means, the axes of said pins being parallel with the axes of said racks.

8. An aligning fixture as set forth in claim 7 wherein each of said wedge means has an oblong aperture parallel to said angled edge and said fixture further comprises threaded fastener means passing through each of said defined oblong apertures and said base for positioning said wedge means within said recess means of said base against said rack teeth.

* * * * *